(12) United States Patent
Brittenham (10) Patent No.: US 7,301,724 B2
(45) Date of Patent: Nov. 27, 2007

(54) TRANSDUCING HEAD

(75) Inventor: Steven L. Brittenham, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 40 days.

(21) Appl. No.: 10/936,340

(22) Filed: Sep. 8, 2004

(65) Prior Publication Data

US 2006/0050428 A1    Mar. 9, 2006

(51) Int. Cl.
G11B 5/584    (2006.01)
G11B 5/56    (2006.01)

(52) U.S. Cl. ............... 360/77.12; 360/291; 360/291.9; 310/311; 29/25.35; 29/603.01

(58) Field of Classification Search ............... None
See application file for complete search history.

(56) References Cited

U.S. PATENT DOCUMENTS

| 4,831,275 | A | 5/1989 | Drucker ............... 250/566 |
|---|---|---|---|
| 4,864,548 | A | 9/1989 | Butler ............... 367/155 |
| 4,905,107 | A | 2/1990 | Klein ............... 360/75 |
| 5,117,589 | A | 6/1992 | Bischoff et al. |
| 5,191,492 | A | 3/1993 | Nayak et al. ............... 360/78.02 |
| 5,342,989 | A | 8/1994 | Barcus ............... 84/730 |
| 5,513,051 | A * | 4/1996 | Lee et al. ............... 360/77.16 |
| 5,637,800 | A * | 6/1997 | Finsterwald et al. ............... 73/642 |
| 6,398,095 | B1 | 6/2002 | Tatsomi et al. ............... 226/180 |
| 6,522,506 | B1 | 2/2003 | Ozue ............... 360/291.9 |
| 6,611,080 | B2 | 8/2003 | Ngol et al. ............... 310/323.02 |
| 6,686,201 | B2 * | 2/2004 | Potyrailo et al. ............... 436/2 |
| 6,686,210 | B1 * | 2/2004 | Gilbert et al. ............... 438/3 |
| 6,719,409 | B2 | 4/2004 | Sasaki et al. ............... 347/70 |
| 6,721,136 | B2 | 4/2004 | Kurihara et al. ............... 360/294.4 |
| 6,728,077 | B1 | 4/2004 | Murphy ............... 360/294.4 |
| 6,738,231 | B2 | 5/2004 | Araya et al. ............... 360/294.4 |
| 6,947,247 | B2 * | 9/2005 | Schwarz et al. ............... 360/76 |
| 2004/0047067 | A1 * | 3/2004 | Yip ............... 360/77.12 |
| 2004/0233583 | A1 * | 11/2004 | Yanagisawa ............... 360/294.7 |
| 2005/0121253 | A1 * | 6/2005 | Stewart et al. ............... 181/108 |
| 2006/0044699 | A1 * | 3/2006 | Hirano et al. ............... 360/294.4 |

* cited by examiner

Primary Examiner—Andrew L. Sniezek (57) ABSTRACT

Determining an error in position of at least two heads coupled to a piezoelectric material, and changing a potential applied to a piezoelectric material to reduce the error in position of the at least two heads.

25 Claims, 6 Drawing Sheets

TRANSDUCING HEAD

BACKGROUND

Several types of tape drives include a transducer having a plurality of read/write transducing elements for use with a plurality of channels. The transducer can include a plurality of read/write heads having the capability to read and write data to multiple tracks or channels on a flexible medium such as tape. The transducer can also include at least one servo head for reading servo information from the tape. In some tape drives, the read and write transducers are merged. Some tape drives do not include a separate servo element, and servoing is done by the data head. In some instances, the transducer can include at least two servo heads positioned at or near the edges of the tape. The transducer, therefore, includes a plurality of read/write heads and at least one servo head that are positioned on a ceramic bar. The position of each of the heads is fixed.

The tape includes servo information written on the edges of the tape. The servo head reads the servo information and produces a position signal used to determine the position of the transducing head with respect to the tape. The position signal is also a control signal in a feedback control loop used to position the transducer and keep the read/write heads on track.

In a multi-channel read/write recording system like the one described above, any expansion or contraction of the recording medium results in an error in placement of the track on the tape relative to the read/write head associated with that track. In other words, if the tape shrinks or expands, the position of the track with respect to the read/write head shifts. Past solutions have included formulating tapes that do not contract or expand as much, usually resulting in higher cost tape, or limiting the spacing between tracks such that the amount of tape contraction or expansion is small compared to the separation between tracks. The later solution limits the ultimate capacity of the tape product.

BRIEF DESCRIPTION OF THE FIGURES

The present invention is illustrated by way of example and not limitation in the Figures of the accompanying drawings in which.

DETAILED DESCRIPTION

Figure 1:
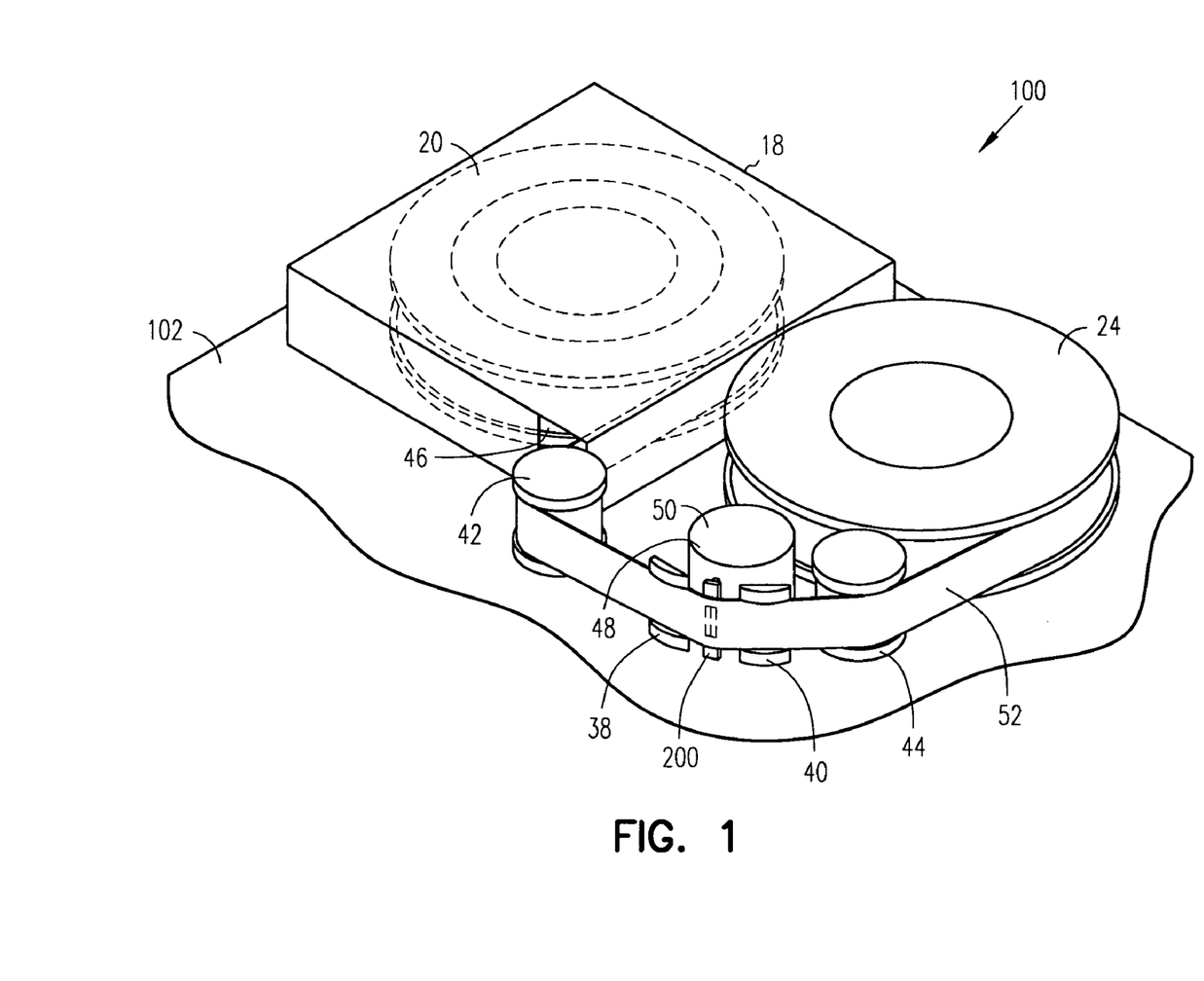
FIG. 1 is a schematic diagram of a tape drive system, according to an example embodiment.

FIG. 1 is a partial perspective view of a tape drive system 100, according to an example embodiment. FIG. 1 illustrates the internal operating configuration of tape drive 100 when data cartridge 18 is loaded therein so as to position a data tape 52 for linear movement along a tape path over a support surface 102 of the tape drive 100. Coupled to the support surface 102 is a first reel 20 and a second reel 24. Also coupled to the support surface 102 is a support structure mechanism that includes a first roller guide 42, a second roller guide 44, a first stationary guide 38, and a second stationary guide 40. As shown in FIG. 1, a tape 52 is supported by a tape carrier including the first reel 20 and the second reel 24, extending between a data cartridge 18 and the support structure mechanisms of tape drive 12. The first roller guide 42, the second roller guide 44, the first stationary guide 38, and the second stationary guide 40 cooperate to deliver tape 52 along a travel position 33 situated directly against a transducer 200. The transducer 200 is sometimes referred to as a transducer head or magnetic tape head. More specifically, the tape 52 exits the data cartridge 18 along an exit aperture 46 and travels around the first roller guide 42 and around the second roller guide 44, as well as the first stationary guide 38 and the second stationary guide 40. Transducer 200 is positioned between the first stationary guide 38 and the second stationary guide 40 such that tape tension is applied to the tape 52 across the transducer 200 during normal operation of the tape drive 100. The transducer 200 includes a plurality of read/write elements (shown in FIGS. 2, 5 and 9) for reading data from or writing data to the tape 52 of the cartridge 18. Alternatively, any comparable tape travel path can be provided.

The transducer 200 is coupled to an actuator 48. As shown in FIG. 1, the actuator 48 is a linear actuator. As shown, the linear actuator moves the coupled transducer 200 transverse to the path of travel of the tape 52. Actuator 48 is shown in simplified form as a cylindrical body, with an actuator housing 50. It is understood that actuator 48 can be formed from any of a number of constructions, wherein a linear-magnet displacement member, or any linear displacement member, enables movement of transducer 200 transverse to the travel direction of tape 52 such that at least one of a plurality of read/write head sensing elements on transducer 200 can be properly positioned onto tracks of information contained on tape 52. Actuator 48 is also implemented to position read/write head elements of transducer 200 along tape 52 during normal tape drive operation.

Figure 2:
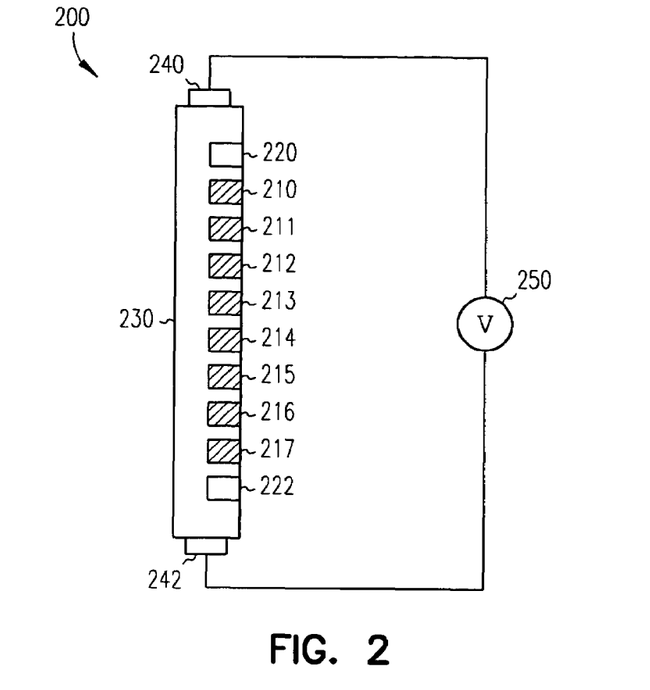
FIG. 2 is a schematic view of the surface of the transducer showing a plurality of read/write heads, according to an example embodiment.

FIG. 2 is a schematic view of the transducer 200 showing a plurality of read/write heads 210, 211, 212, 213, 214, 215, 216, 217 according to an example embodiment. The transducer 200 also includes a first servo head 220 and a second servo head 222. The plurality of read/write heads 210, 211, 212, 213, 214, 215, 216, 217 are located between the first servo head 220 and the second servo head 222. In other words, the first servo head 220 is located at one edge of the plurality of read/write heads 210, 211, 212, 213, 214, 215, 216, 217 and the second servo head 222 is located at the other edge of the plurality of read/write heads 210, 211, 212, 213, 214, 215, 216, 217. The first servo head 220, the second servo head 222, and the plurality of read/write heads 210, 211, 212, 213, 214, 215, 216, 217 are formed on a block of piezoelectric material 230. In one embodiment, the piezoelectric material 230 is Gallium Arsenide. In another embodiment, the piezoelectric material 230 is Silicon on Sapphire. Other embodiments include other piezoelectric materials. The first servo head 220, the second servo head 222, and the plurality of read/write heads 210, 211, 212, 213, 214, 215, 216, 217 are formed with a geometry that corresponds to the data tracks and the servo tracks on the tape 52. Although in FIG. 2, the transducer includes eight read/write heads for data, it is contemplated that other embodiments can include other numbers of read/write heads for data, and other numbers of servo elements for tracking. Communicatively coupled to the block of piezoelectric material 230 is a first electrode 240 and a second electrode 242. The first electrode 240 and the second electrode 242 are connected to a source of variable voltage 250. The piezoelectric material 230 can produce a selected displacement with a high force capability when voltage is applied at the first electrode 240 and the second electrode 242. In the configuration shown, the piezoelectric material 230 can displace uniformly along the length of the block of piezoelectric material that forms the transducer 200. In another embodiment, intermixing servo elements are intermixed or positioned between data elements. Such a configuration could be used for better estimates of the average or uniformity of the expansion/contraction along the length of the transducer substrate, such as piezoelectric material 230.

The piezoelectric material 230 has a first end and a second end. A first read head, such as servo head 220, is coupled to the piezoelectric material 230, and a second read head, such as servo head 222, is coupled to the piezoelectric material 230. The second read head 220 is spaced from the first read head 210. The first electrode 240 is coupled near the first end of the piezoelectric material 230, and the second electrode 242 is coupled near the second end of the piezoelectric material 230. In one embodiment, the first read head 220 and the second read head 222 are coupled to the piezoelectric material 230 inboard the first end and the second end of the piezoelectric material 230. The transducer 200 also includes a source of voltage communicatively coupled to the first electrode 240 and the second electrode 242. The first read head 210 and the second read head 212 are adapted to read servo information. The transducer 200 also includes a read/write head, such as read/write head 210, adapted to read and write information representative of data. In some embodiments, the transducer 200 further includes a plurality of read/write heads, such as read/write heads 210-217, adapted to read and write information representative of data. In some embodiments, the piezoelectric material 230 is gallium arsenide and in other embodiments the piezoelectric material 230 is silicon-on-sapphire. The first and second read heads 220, 222 can include a magnetoresistive element 330 (see FIG. 3), a thin film inductive head element, or other transducing elements that can be appropriately deposited/affixed to the aforementioned piezoelectric substrate material.

Figure 3:
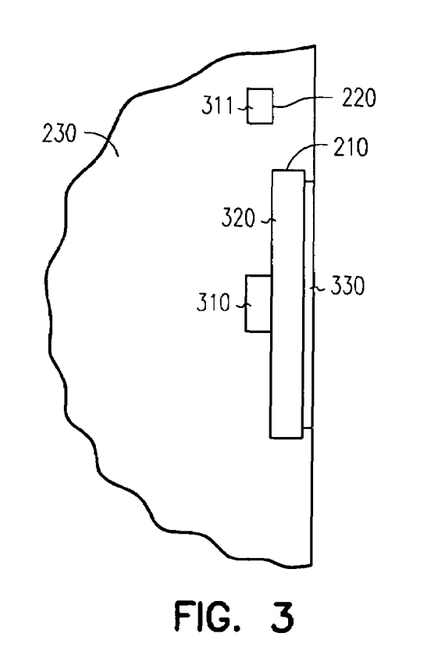
FIG. 3 is a schematic view of a portion of the transducer that includes the servo head and the read/write head, according to an example embodiment.

FIG. 3 is a schematic view of a transducing portion of the transducer 200 that includes the servo head 220 and one of the plurality of read/write heads 210. In one example embodiment, each read/write head, such as read/write head 210 includes a read element 310, a magnetic shield 320 and a write element 330. The magnetic shield 320 is positioned between the read element 310 and the write element 330. The magnetic shield 320 is positioned to divert or carry lines of flux from the write element during operation of the write head 330, as during an operation such as writing of data to a tape 52. The read element 310 is can be a thin film head or a magneto resistive or giant magneto resistive element or the like. The write element 330, in some embodiments, is a thin film head. In other embodiments of the invention, the write element could also be a ferrite head or other type of head. In one embodiment of the transducer, the read element 310, the magnetic shield 320, and the write element 330 can all be formed using techniques similar to those for processing semiconductors. The first servo head 220 and the second servo head 222 are generally only used to read servo information from the tape 52. Since the first servo head 220 and the second servo head 222 are not used for writing servo information to the tape 52, the first servo head 220 and the second servo head 222 generally include only a read head, such as a magneto resistive head or a giant magneto resistive head 311.

Figure 4:
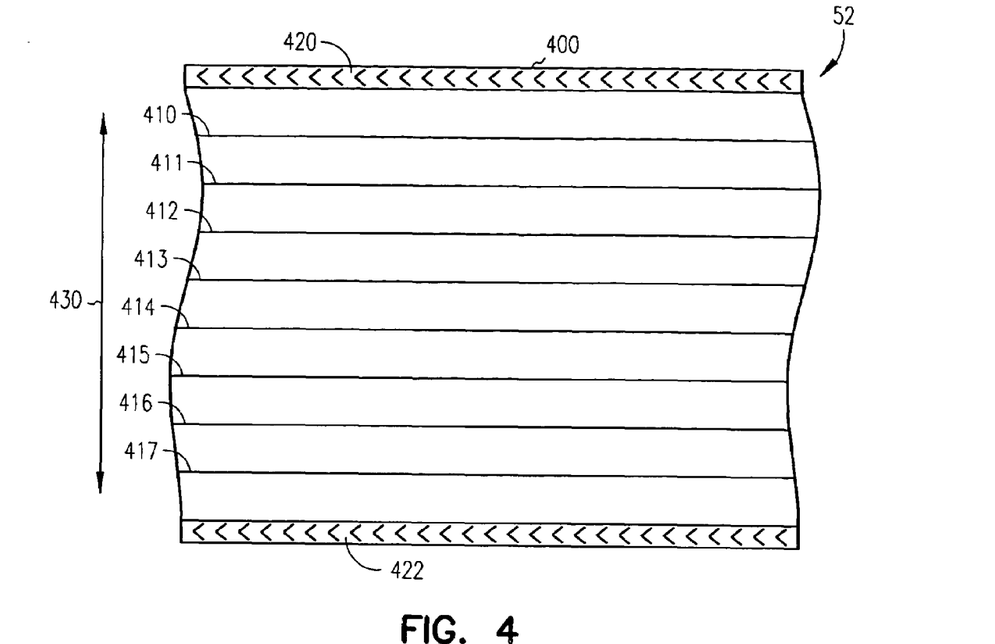
FIG. 4 is a schematic view of a tape medium including a plurality of tracks and servo track information, according to an example embodiment.

FIG. 4 is a schematic view of a portion 400 of the tape 52 including a plurality of data tracks 410, 411, 412, 413, 414, 415, 416, 417 and a first servo track 420 and a second servo track 422, according to an example embodiment. The data tracks 410, 411, 412, 413, 414, 415, 416, 417 are illustrated in FIG. 4 as a centerline associated with the data track. In fact, the data track has a width. The servo tracks 420, 422 are shown as tracks having a chevron servo pattern. In other embodiments, other servo patterns can be used. The tape 52 can contract or expand depending on a number of factors, including the age of the tape and different operating environments and other factors. The contraction or expansion of the tape 52 is depicted by arrow 430 in FIG. 4, although other angles of contraction or expansion are also possible.

Figure 5:
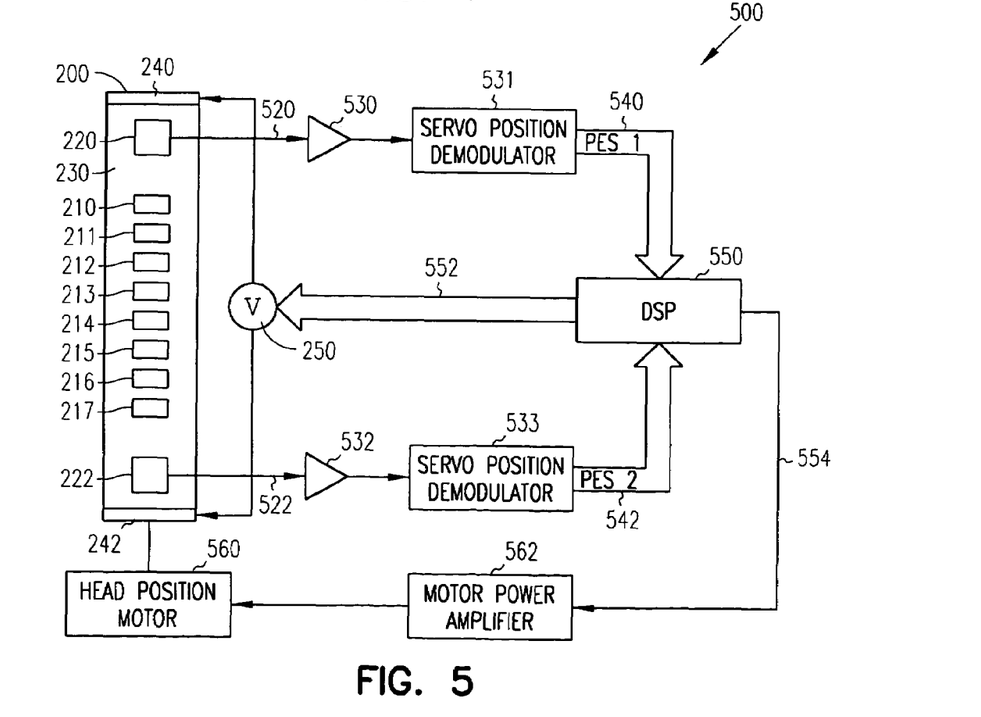
FIG. 5 is a schematic view of a control system for a tape drive, according to another example embodiment.

FIG. 5 is a schematic view of a control system 500 for a tape drive 50, according to an example embodiment using servo tracks at the edges of the data tracks to position the head elements. A control system 500 includes a transducer 200 adapted to read servo information from the tape 52 (See FIG. 4). The transducer also includes read/write elements 210, 211, 212, 213, 214, 215, 216, 217 for reading and writing information repeating data to the tape 400. The transducer 200 includes a first servo element 220, and a second servo element 222 spaced from the first servo element 220. The tape 52 also includes a first track 420 with servo information thereon, and a second track 422 with servo information thereon. The second track 422 is spaced from the first track 420. A first position signal 520 indicates the position of the first servo element 220 with respect to the center of the first servo track 420. A preamplifier 530 amplifies the first servo signal 520. After amplification, the servo signal is demodulated at a first servo position demodulator 531 to produce a first position error signal 540. A second position signal 522 indicates the position of the second servo element 222 with respect to the center of the second servo track 422. A preamplifier 532 amplifies the second servo signal 522. After amplification, the second servo signal 522 is demodulated at a second servo position demodulator 533 to produce a second position error signal 542.

The first position error signal 540 and the second position error signal 542 are input to a digital signal processor (DSP) 550. The space between the first servo element 220 and the second servo element 222 can be determined. When the space between the first servo element 220 and the second servo element 222 differs from the space between the first servo track 420 and the second track 422 the DSP 550 outputs a signal 552 to the voltage source 250 to change the spacing between the first servo element 220 and the second servo element 220 responsive to the position error signals 540, 542. The DSP 550 outputs a signal 552 to vary the voltage at the variable voltage source 250. The voltage source 250 is capable of outputting a variable voltage.

The DSP 550 determines where the servo head 220 and the servo head 222 are with respect to the track centers of servo tracks 420 and 422, respectively. The DSP 550 splits the difference between where the servo elements 220, 222 are with respect to individual track centers of the corresponding servo tracks 420, 422. In the case of tape expansion or contraction, the position error signals 540, 542 can no longer be identical. Both servo elements 220, 224 cannot simultaneously be on or offset equally from their respective track centers. The DSP averages the two position error signals 540, 542 to determine the best overall placement of the head stack to minimize the errors across all the read/write heads 210-217. The difference in respective track centers of the servo elements 220, 222 (as reflected by the position error signals 540, 542) is used to vary the voltage at the variable voltage source 250 and vary the voltage applied to the piezoelectric substrate 230 to eliminate this discrepancy.

Referring now to both FIG. 5 and FIG. 2, increasing the voltage output from the voltage source 250 increases the length of the piezoelectric substrate 230 while decreasing the voltage output from the voltage source 250 decreases the length of the piezoelectric substrate 230. The voltage source 250 is also communicatively coupled to the first electrode 240 and the second electrode 242. The control system 500 also can be considered to include the first electrode 240 communicatively coupled to one portion of the piezoelectric material 230, and a second electrode 242 communicatively coupled to another portion of the piezoelectric material 230. The piezoelectric material can expand or contract substantially uniformly and therefore the spacing between the read/write heads 210-217 on the piezoelectric material 230 can also vary substantially uniformly. As a result, when the distance transverse to the length of the tape either expands or contracts, as indicated by arrow 430 (see FIG. 4), the read/write heads 210-217 can more closely track the corresponding data tracks 410-417, resulting in a lower error rate. The servo read elements 220, 222 can also more closely track the corresponding servo tracks 420, 422, respectively. The digital signal processor or DSP 550 also determines when the transducer 200 can be shifted or moved with respect to the tape 52 (see FIG. 4). When the transducer 200 can be shifted, the DSP 550 outputs the signal 554 to a motor power amplifier 562. The signal 554 is amplified in the motor power amplifier 562 so that the signal can be used to drive a head position motor 560. In other words, the signal 554 output from the DSP 550 is amplified at the power motor amplifier 562 to drive a head position motor 560 which shifts the transducer 200. When the transducer 200 is shifted by the head position motor 560, the servo elements 200, 222, as well as each of the read/write elements 210-217, also shift with respect to the servo tracks 420, 422 and the data tracks 410-417. The amount of shift applied minimizes the position error signals 540, 542 as well as minimizing the error rates from the individual read/write elements 210-217. Thus, the DSP 550 outputs a signal 554 to reposition the transducer 200 using the head position motor 560 as well as outputs a signal 552 to vary the voltage at the variable voltage source 250 to vary the spacing between the servo heads 220, 222 and the read/write elements 210-217. These controls are applied to minimize the position error signals 540, 542 that are fed into the DSP 550 in the servo system 500, shown in FIG. 5.

Figure 6:
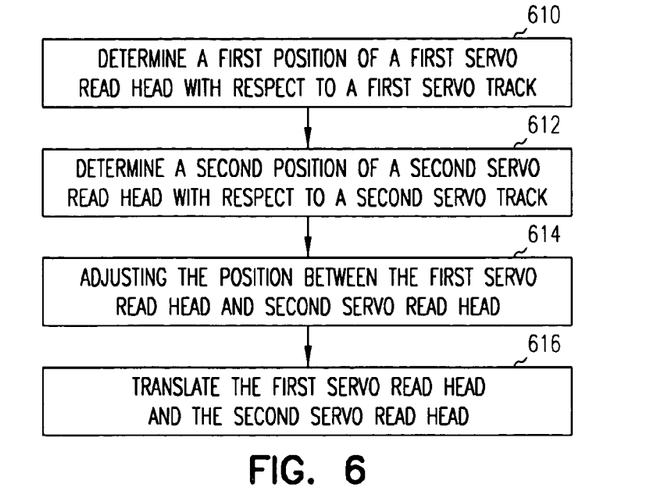
FIG. 6 is a flow diagram illustrating a method for controlling a transducer, according to an example embodiment.

FIG. 6 is a flow diagram illustrating a method 600 for controlling a transducer, according to an example embodiment. The method 600 includes determining a first position of a first servo read head with respect to a first servo track 610, determining a second position of a second servo read head with respect to a second servo track 612, and adjusting the position between the first servo read head and the second servo read head 614. Adjusting the position 614 includes applying a voltage to a substrate that carries the first servo read head and the second servo read head. Adjusting the position 614 substantially minimizes an error signal from the first servo read head and substantially minimizes an error signal from the second servo read head. In some embodiments, the method also includes translating the first servo read head and the second servo read head 616. In other words, the entire transducer is moved with respect to the tape 52. Generally, the transducer is moved but in some embodiments, the tape 52 can be moved.

Figure 7:
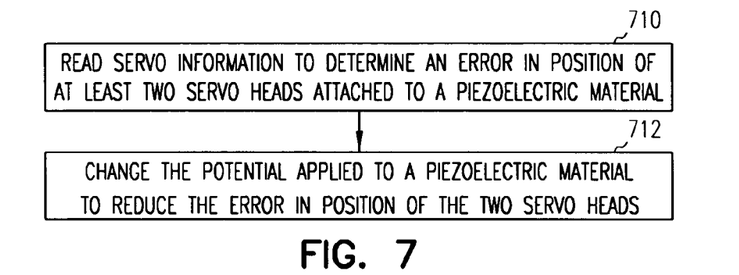
FIG. 7 is a flow diagram illustrating a control method for controlling a transducer, according to another example embodiment.

FIG. 7 is a flow diagram illustrating a control method 700 for controlling a transducer, according to another example embodiment. The control method 700 includes reading servo information to determine an error in position of at least two servo heads coupled to a piezoelectric material 710, and changing the potential applied to a piezoelectric material to reduce the error in position of the two servo heads 712. The potential on the piezoelectric material is selectively reduced to decrease the spacing between at least two servo heads coupled to a piezoelectric material, or selectively increased to increase the spacing between at least two servo heads coupled to a piezoelectric material. The servo information is read periodically to determine an error in position between the at least two servo heads.

Figure 8:
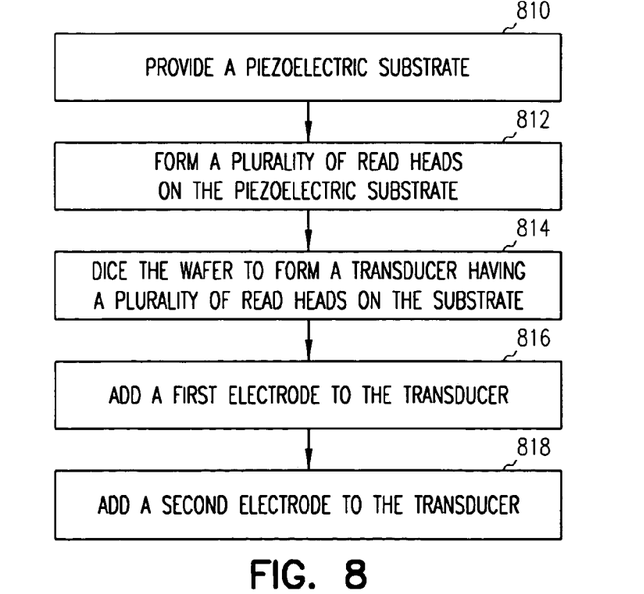
FIG. 8 is a flow diagram illustrating a method for forming a transducer head, according to an example embodiment.

FIG. 8 is a flow diagram illustrating a method 800 for forming a transducer head, according to an example embodiment. The method 800 includes providing a piezoelectric substrate 810, and forming a plurality of read heads on the piezoelectric substrate 812. In some embodiments, the substrate is a wafer and the method 800 includes dicing the wafer to form a transducer having a plurality of read heads on the substrate 814. The method 800 further includes adding a first electrode to the transducer 816, and adding a second electrode to the transducer 818.

Figure 9:
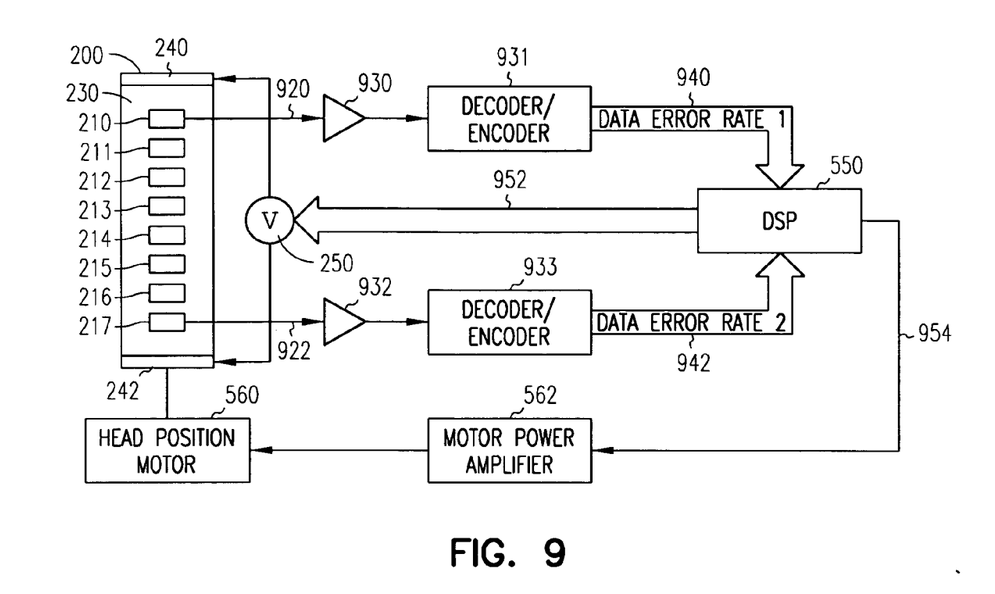
FIG. 9 is a illustrates an example computer system used in conjunction with certain example embodiments.

FIG. 9 is a schematic view of a control system 900 for a tape drive 50 (see FIG. 1) according to another example embodiment. In this particular embodiment of the invention, the transducer 200 does not include servo heads. The transducer 200 includes read/write elements 210, 211, 212, 213, 214, 215, 216, 217. The position of the read/write elements 210-217 is determined by the data error rate. This is referred to as servoing off the data. During a read operation, a signal 920 representing data is produced by a read/write element 210. The read signal 920 is input to a preamp 930. The signal is then input to a decoder/encoder 931 which decodes the information associated with the read signal to produce a data signal. Data signals typically have read errors. The read error rate can be monitored to determine if the read/write element 210 is positioned over the center of the corresponding data track on a tape 52.

A data error rate signal 940 is output from the decoder/encoder 931. The data error rate signal 940 is input to a digital signal processor 550. A second read/write element produces a read signal 922, which is amplified at a preamp 932 before being input to a decoder/encoder 933. A second data error rate signal 942 is output from the decoder/encoder to the digital signal processor 550. It should be noted that an increase in error rate indicates that the respective read/write element, such as read/write element 210 or 217, is positioned farther off center than when there is a lower error rate. By moving the read/write element 210 or the read/write element 217 to minimize the data to error rate signals 940, 942, respectively, the read/write elements 210, 217 can be said to be flown over the center line of a corresponding channel or track including information that, when decoded, is data. When the data error rate signals 940, 942 are increased, the DSP 550 produces an output signal 954 to a motor power amplifier 562 which in turn produces a current that is input to a head position motor 560 to shift the transducer 200. Thereby, each of the read/write elements 210, 211, 212, 213, 214, 215, 216, 217 along with the piezoelectric substrate 230 of the transducer 200. The DSP 550 can also produce an output signal 952 to a source of variable voltage 250. The signal 952 varies the voltage at the variable voltage output source 250 which in turn varies the voltage across the piezoelectric substrate 230 on which the read/write elements 210-217 are coupled. A first electrode 240 is coupled at one end of the piezoelectric material or piezoelectric substrate 230 and a second electrode 242 is coupled at another end of the piezoelectric material or piezoelectric substrate 230. Therefore, by varying the voltage at the variable voltage source 250 the voltage along the length of the piezoelectric material or piezoelectric substrate 230 is also changed. In response to the change in voltage across the piezoelectric material, the spacing between the read/write elements on the piezoelectric material can either become larger or smaller.

New data error rate signals can be produced as a result of either shifting the transducer 200 using the head position motor 560 or as a result of varying the voltage across the piezoelectric element 230. The new data error rate signals 940, 942 can be used to take further corrective actions that can minimize or reduce the data error rate signals 940, 942. It should be noted that the signals from the read/write elements are generally amplified before being sent to an encoder/decoder. Although a preamplifier and an encoder/decoder is shown for two of the channels associated with the control system 900 (shown in FIG. 9), there could be a separate preamplifier and encoder/decoder for each of the channels, or there could be one preamplifier and one encoder/decoder for all of the channels.

In a further variation on this second example embodiment, the amplitude of the readback data signals could be used for providing position error feedback. The decoder/encoders 931 and 933 could be replaced by peak amplitude detectors. The peak amplitude detectors would produce signals, replacing signals 940 and 942, that reflect the loss in peak amplitude that results from head elements that are not fully centered on the track. In other words, if any portion of the reading element is off track, a proportion of the full output amplitude on that channel can not be achieved. However, both this and the error rate embodiment requires additional information to resolve the ambiguity between increases in error rate or reductions in amplitude that appear identical independent of which direction the heads are moving off track center. One means to provide this additional information is accomplished by making incremental servo adjustments assuming movement in one direction may reduce the error rate, then reversing the movement if the error rate increases as opposed to decreases.

Figure 10:
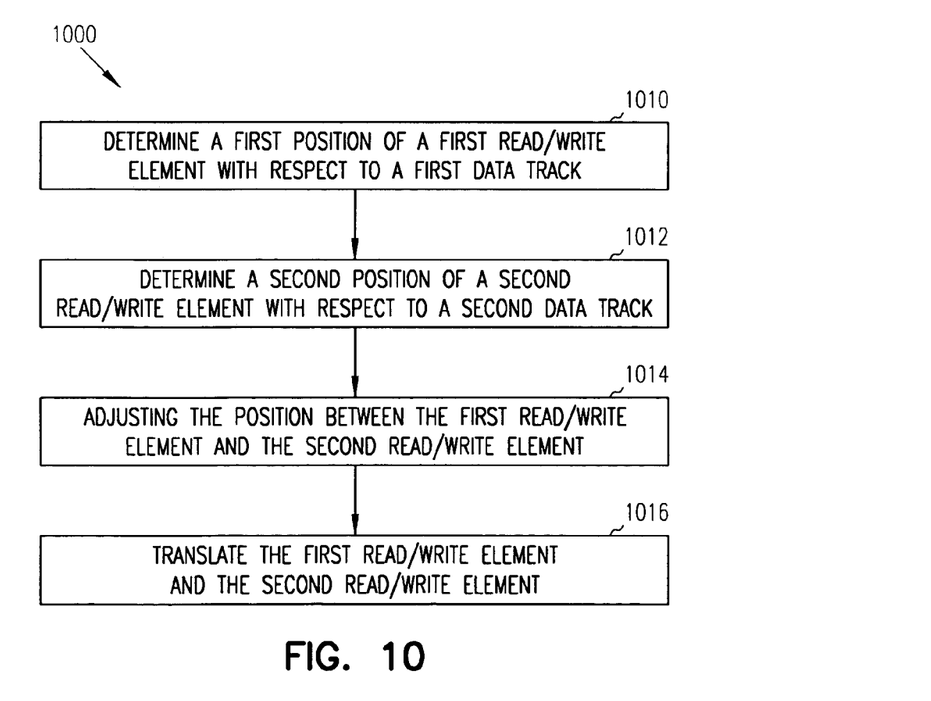
FIG. 10 is a flow diagram illustrating a method for controlling a transducer according to one embodiment.

FIG. 10 is a flow diagram illustrating a control method 1000 for controlling a transducer according to another example embodiment. The control method 1000 includes reading data from a first read/write element to determine a first position of the first read/write element with respect to a first data track 1010. A second position of a second read/write element is determined with respect to a second data track, as depicted by reference numeral 1012. In each case, the error rate associated with data read from the respective data track is monitored to determine the data error rate. Higher data error rates indicate that the respective read/write element flying over the corresponding data track is off center or more off center than when the data error rate is occurring at a lower rate. The position between the first read/write element and the second read/write element is adjusted, as depicted by reference numeral 614. The first read/write element and the second read/write element can also be translated, as depicted by reference numeral 1016. Translation includes moving the transducer that carries the respective read/write elements.

Figure 11:
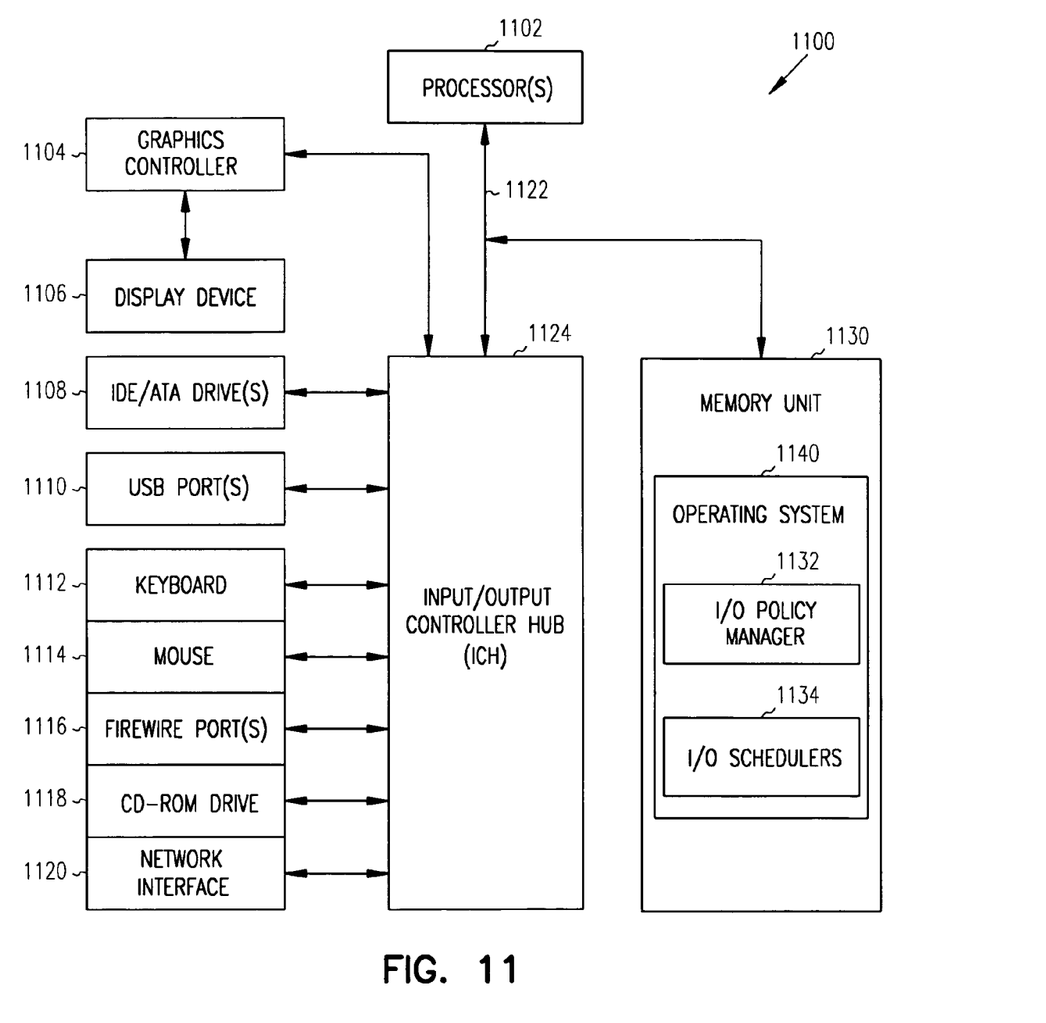
FIG. 11 is schematic view of a computer system used in conjunction with certain embodiments.

FIG. 11 illustrates an example computer system 1100 used in conjunction with certain embodiments of the invention. The computer system 1100 can be a microprocessor or controller used in the control system 500 discussed above. The controller 540 can also be a small portion of a computer system 1100. The computer system 1100 can be used to control many other aspects of the tape drive 50 in addition to the control system 500. For example, the computer system 1100 can be used to execute instructions from a medium used to control various aspects of the tape drive.

As illustrated in FIG. 11, computer system 1100 comprises processor(s) 1102. The computer system 1100 also includes a memory unit 1130, processor bus 1122, and Input/Output controller hub (ICH) 1124. The processor(s) 1102, memory unit 1130, and ICH 1124 are coupled to the processor bus 1122. The processor(s) 1102 may comprise any suitable processor architecture. The computer system 1100 may comprise one, two, three, or more processors, any of which may execute a set of instructions in accordance with embodiments of the present invention.

The memory unit 1130 includes an operating system 1140, which includes an I/O scheduling policy manager 1132 and I/O schedulers 1134. The memory unit 1130 stores data and/or instructions, and may comprise any suitable memory, such as a dynamic random access memory (DRAM), for example. The computer system 1100 also includes IDE drive(s) 1108 and/or other suitable storage devices. A graphics controller 1104 controls the display of information on a display device 1106, according to embodiments of the invention.

The Input/Output controller hub (ICH) 1124 provides an interface to I/O devices or peripheral components for the computer system 1100. The ICH 1124 may comprise any suitable interface controller to provide for any suitable communication link to the processor(s) 1102, memory unit 1130 and/or to any suitable device or component in communication with the ICH 1124. For one embodiment of the invention, the ICH 1124 provides suitable arbitration and buffering for each interface.

For one embodiment of the invention, the ICH 1124 provides an interface to one or more suitable integrated drive electronics (IDE) drives 1108, such as a hard disk drive (HDD) or compact disc read only memory (CD ROM) drive, or to suitable universal serial bus (USB) devices through one or more USB ports 1110. For one embodiment, the ICH 1124 also provides an interface to a keyboard 1112, a mouse 1114, a CD-ROM drive 1118, and one or more suitable devices through one or more firewire ports 1116. The ICH 1124 also provides a network interface 1120 though which the computer system 1100 can communicate with other computers and/or devices.

In one embodiment, the computer system 1100 includes a machine-readable medium that stores a set of instructions (e.g., software) embodying any one, or all, of the methodologies for dynamically loading object modules described herein. Furthermore, software can reside, completely or at least partially, within memory unit 1130 and/or within the processor(s) 1102.

Thus, a system, method, and machine-readable medium including instructions for Input/Output scheduling have been described.

Referring now t FIGS. 1, 2, 5 and 9, a tape drive 50 is a system that includes a tape transport mechanism, and a transducer 200. The transducer 200 includes a piezoelectric material 230 having a first end and a second end, a first read head 220 coupled to the piezoelectric material 230, and a second read head 222 coupled to the piezoelectric material 230. The second read head 222 is spaced from the first read head 222. A first electrode 240 is coupled near the first end of the piezoelectric material 230, and a second electrode 242 is coupled near the second end of the piezoelectric material 230. The tape drive 50 also includes a source of variable voltage 250 communicatively coupled to the first electrode 240 and the second electrode 242. The tape drive 50 also includes a control mechanism 500 responsive to signals 520, 522 from the first read head 220 and the second read head 222 The control mechanism 500 varies the voltage at the voltage source 250 to lengthen or shorten the distance between the first read head 220 and the second read head 222. The control mechanism can be a dedicated controller or a portion of a microprocessor or a portion of a computer system 1100. The first read head 220 and the second read head 222 are adapted to read servo information. In some embodiments, the first read head 220 and the second read head 222 include a magnetoresistive element. In other embodiments, the tape drive 50 includes a plurality of read/write heads 210-217 adapted to read and write information representative of data. In some embodiments, the piezoelectric material 230 is gallium arsenide and in others the piezoelectric material 230 is silicon-on-sapphire.

Although the present invention has been described with reference to specific example embodiments, it can be evident that various modifications and changes may be made to these embodiments without departing from the broader spirit and scope of the invention. Accordingly, the specification and drawings are to be regarded in an illustrative rather than a restrictive sense.

The invention claimed is:

1. A control system comprising:
  a transducer further comprising:
    a first servo element; and
    a second servo element spaced from the first servo element; and
    a ceramic element having a length that includes both the first servo element and the second servo element and the space between the first servo element and the second servo element, the first servo element and the second servo element attached between the ends of the ceramic element;
  a tape further comprising:
    a first track with servo information thereon: and
    a second track with servo information thereon, the second track spaced from the first track;
  a position signal indicating when a space between the first servo element and the second servo element differs from a space between the first track and the second track; and
  means for changing the spacing between the first servo element and the second servo element by changing the length of the ceramic element in response to the position signal, wherein the ceramic element is a piezoelectric material.

2. The control system of claim 1 wherein the first servo element and the second servo element are coupled to a surface of the ceramic material.

3. The control system of claim 1 wherein the first servo element and the second servo element are directly coupled to a piezoelectric material.

4. The control system of claim 3 further comprising:
  a first electrode communicatively coupled to one portion of the piezoelectric material; and
  a second electrode communicatively coupled to another portion of the piezoelectric material.

5. The control system of claim 3 further comprising:
  a first electrode communicatively coupled to one portion of the piezoelectric material;
  a second electrode communicatively coupled to another portion of the piezoelectric material; and
  a voltage source communicatively coupled to the first electrode and the second electrode.

6. The control system of claim 5 wherein the voltage source is capable of outputting a variable voltage.

7. A transducer comprising:
  a piezoelectric material having a first end and a second end:
  a first read head coupled to the piezoelectric material;
  a second read head coupled to the piezoelectric material, the second read head spaced from the first read head;
  a third read head coupled to the piezoelectric material, the third read head spaced from the second read and spaced from the first read head;
  a first electrode coupled near the first end of the piezoelectric material; and
  a second electrode coupled near the second end of the piezoelectric material, wherein changing the length of the piezoelectric material changes the spacing between the first read head and the second read head and the third read head in approximately the same proportion as the change in the length of the piezoelectric material.

8. The transducer of claim 7 wherein the first read head and the second read head are coupled to the piezoelectric material inboard the first end and the second end of the piezoelectric material.

9. The transducer of claim 7 further comprising a source of voltage communicatively coupled to the first electrode and the second electrode.

10. The transducer of claim 7 wherein the first read head and the second read head are adapted to read servo information.

11. The transducer of claim 7 wherein the piezoelectric material is gallium arsenide.

12. The transducer of claim 7 wherein the piezoelectric material is silicon-on-sapphire.

13. A transducer comprising:
  a piezoelectric material having a first end and a second end:
  a first read head coupled to the piezoelectric material;
  a second read head coupled to the piezoelectric material, the second read head spaced from the first read head;
  a first electrode coupled near the first end of the piezoelectric material;
  a second electrode coupled near the second end of the piezoelectric material, the space between the first head and the second head configured to change in response to a change in the piezoelectric material; and
  a read/write head adapted to read and write information representative of data.

14. The transducer of claim 13 further comprising a plurality of read/write heads adapted to read and write information representative of data.

15. A transducer comprising:
a piezoelectric material having a first end and a second end:
a first read head coupled to the piezoelectric material;
a second read head coupled to the piezoelectric material, the second read head spaced from the first read head;
a first electrode coupled near the first end of the piezoelectric material; and
a second electrode coupled near the second end of the piezoelectric material, wherein the first and second read heads include a magnetoresistive element, and wherein the space between the first head and the second head changes in response to a change in the piezoelectric material.

16. A tape drive comprising:
a tape transport mechanism; and
a transducer further comprising:
  a piezoelectric material having a first end and a second end:
  a first read head coupled to the piezoelectric material;
  a second read head coupled to the piezoelectric material, the second read head spaced from the first read head;
  a third read head coupled to the piezoelectric material, the third read head spaced from the second read and spaced from the first read head;
  a first electrode coupled near the first end of the piezoelectric material; and
  a second electrode coupled near the second end of the piezoelectric material, wherein the space between the first head and the second head and the third head changes in response to a change in the piezoelectric material, the space changes between the heads in approximately the same proportion as the change in the length of the piezoelectric material.

17. The tape drive of claim 16 further comprising a source of variable voltage communicatively coupled to the first electrode and the second electrode.

18. The tape drive of claim 17 further comprising a control mechanism responsive to signals from the first read head and the second read head, the control mechanism varying the voltage at the voltage source to lengthen or shorten a distance between the first read head and the second read head.

19. The tape drive of claim 16 wherein the first read head and the second read head are adapted to read servo information.

20. The tape drive of claim 16 wherein the first read head and the second read head include a magnetoresistive element.

21. The tape drive of claim 16 further comprising a plurality of read/write heads adapted to read and write information representative of data.

22. The tape drive of claim 16 wherein the piezoelectric material is gallium arsenide.

23. The tape drive of claim 16 wherein the piezoelectric material is silicon-on-sapphire.

24. A method comprising:
providing a piezoelectric substrate;
forming a plurality of read heads on the piezoelectric substrate; and
applying a voltage to the piezoelectric substrate to change the spacing between the plurality of read heads attached to the piezoelectric substrate, wherein the substrate is a wafer, the method further comprising dicing the wafer to form a transducer having a plurality of read heads on the substrate.

25. The method of claim 24 further comprising:
adding a first electrode to the transducer; and
adding a second electrode to the transducer.

* * * * *

UNITED STATES PATENT AND TRADEMARK OFFICE
CERTIFICATE OF CORRECTION

PATENT NO. : 7,301,724 B2 Page 1 of 1
APPLICATION NO. : 10/936340
DATED : November 27, 2007
INVENTOR(S) : Steven L. Brittenham It is certified that error appears in the above-identified patent and that said Letters Patent is hereby corrected as shown below:

In column 9, line 56, in Claim 1, after "thereon" delete ":" and insert -- ; --, therefor.

In column 10, line 24, in Claim 7, after "end" delete ":" and insert -- ; --, therefor.

In column 10, line 55, in Claim 13, after "end" delete ":" and insert -- ; --, therefor.

In column 11, line 6, in Claim 15, after "end" delete ":" and insert -- ; --, therefor.

In column 11, line 22, in Claim 16, after "end" delete ":" and insert -- ; --, therefor.

Signed and Sealed this

Eighth Day of July, 2008

JON W. DUDAS
*Director of the United States Patent and Trademark Office*